(No Model.)

J. S. DU BOIS.
DYNAMO ELECTRIC MACHINE.

No. 318,094. Patented May 19, 1885.

Attest
George E. Hummel.
Homer A. Herr.

Inventor
Josiah S. DuBois
By his atty.

UNITED STATES PATENT OFFICE.

JOSIAH S. DU BOIS, OF CAMDEN, NEW JERSEY.

DYNAMO-ELECTRIC MACHINE.

SPECIFICATION forming part of Letters Patent No. 318,094, dated May 19, 1885.

Application filed September 27, 1884. (No model.)

*To all whom it may concern:*

Be it known that I, JOSIAH S. DU BOIS, of the city and county of Camden, and State of New Jersey, have invented a new and useful Improvement in Dynamo-Electric Machines, of which the following is a specification.

My invention has reference to a dynamo-electric machine; and it consists in an air-tight casing or box inclosing the armature and, if desired, the entire poles of the field-magnets, in which casing a partial vacuum is maintained—the greater the vacuum the better; further, in combining with the foregoing suitable vacuum-creating devices, by which the vacuum in said casing may be maintained, and in many details of construction, all of which are fully set forth in the following specification, and shown in the accompanying drawings, which form part thereof.

Heretofore it has been customary to cause a circulation of air through the armature and field-magnets of dynamo-electric machines to carry off the heat, and it has also been customary to cause a constant circulation of cold water about the poles of the field-magnets. By my construction I am enabled to rotate the armature in a vacuum, and thereby overcome the resistance offered by the air, obviating the necessary friction of the armature in beating upon the air, and thereby reducing the consequent heat to a minimum.

Figure 1:
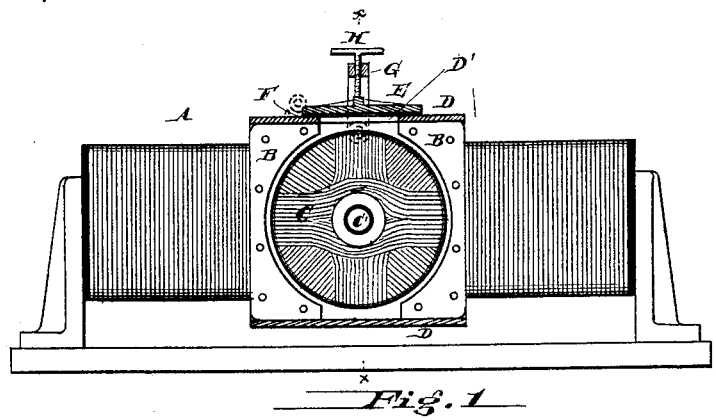
Figure 2:
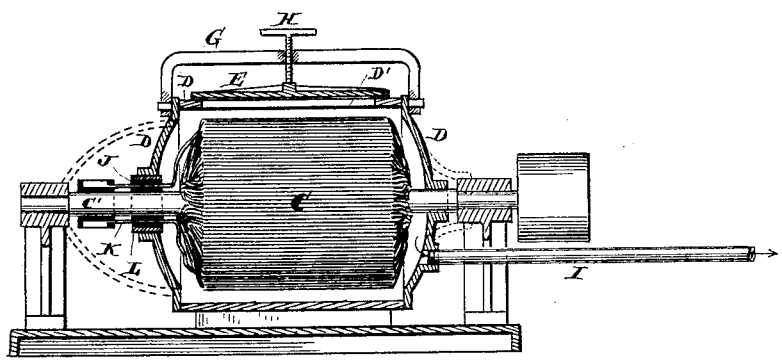
Figure 3:
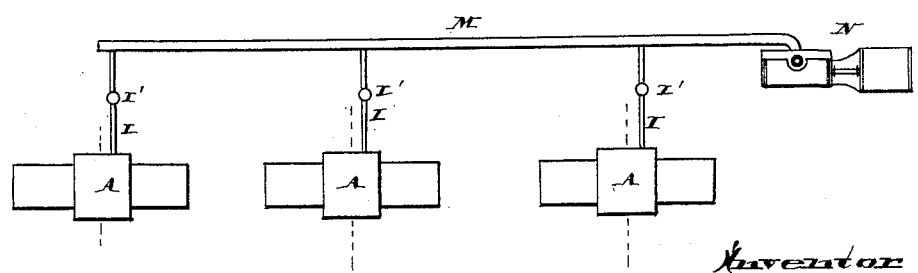

Figure 1 is a side elevation of a dynamo-electric machine embodying my improvement, with part of the casing broken away. Fig. 2 is a sectional elevation of same on line $x\ x$. Fig. 3 is a plan view showing the relative arrangement of a series of dynamo-electric machines made in accordance with my invention and the vacuum-creating mechanism.

A represents the dynamo-electric machine, in which B B are the two poles of the field-magnets, C the armature, and C' the armature-shaft.

D is the casing, which is preferably made of brass, and is adapted to inclose the armature and, preferably, that portion of the field-magnet poles which is adjacent to the armature. The said box or casing is made to fit around the armature-shaft of one end, and upon the other end it may fit a metallic ring, L, which is supported upon a disk of non-conducting material, as hard rubber, J, through which the wires K, from the armature to the commutator, may pass; or, if desired, the said box D may be secured to the supporting-bearings of the armature-shaft, and may, if desired, inclose the commutator itself, the particular construction or method of attachment varying in accordance with the particular make of machine to which the invention is applied. The said casing may have an air-tight cover, E, which may be clamped down by a hand-screw, H, which works through a pivoted strap, G, or, if desired, this cover may be simply screwed down.

I is a pipe connecting with the vacuum-creating devices, and by which the air in the box or casing B is exhausted.

This invention is particularly adapted to stations where there are a large number of dynamo-electric machines, as shown in Fig. 3, and then the pipes I connecting with the main M, through which the air is exhausted by the vacuum-pump N; and the amount of vacuum may be controlled in each machine by valves I', or these valves may be used to simply cut off any machine not in use, and thereby reduce the duty required of the vacuum-pump N.

Having now described my invention, what I claim as new, and desire to secure by Letters Patent, is—

1. A dynamo-electric machine having its armature inclosed within a case in which a partial vacuum is maintained, substantially as and for the purpose specified.

2. A dynamo-electric machine having its armature and poles of its field-magnets inclosed within a stationary case in which a partial vacuum is maintained, substantially as and for the purpose specified.

3. A dynamo-electric machine having its armature inclosed within a case in which a partial vacuum is maintained, in combination with vacuum-creating mechanism and connecting-pipes, substantially as and for the purpose specified.

4. The combination of a series of dynamo-electric machines, having their armatures inclosed in vacuum-boxes, with pipes I, main J, and vacuum-pump N, substantially as and for the purpose specified.

5. The combination of a series of dynamo-electric machines, having their armatures inclosed in vacuum-boxes, with pipes I, valves I', main J, and vacuum-pump N, substantialy as and for the purpose specified.

6. A dynamo-electric machine provided with an air-tight case, inclosing the armature, in which a partial vacuum is maintained, and a removable cover or door to said case, substantially as and for the purpose specified.

7. The combination, in a dynamo-electric machine, of field-magnet poles B, armature C, shaft C', vacuum-case D, metallic ring L, insulator-disk J, and wires K, passing to the commutator, substantially as and for the purpose specified.

In testimony of which invention I hereunto set my hand.

JOSIAH S. DU BOIS.

Witnesses:
R. M. HUNTER,
WILLIAM C. MAYNE.